US007035939B2

(12) United States Patent
Maeda (10) Patent No.: US 7,035,939 B2
(45) Date of Patent: Apr. 25, 2006

(54) METHOD FOR BALANCING LOAD ON A PLURALITY OF SWITCHING APPARATUS

(75) Inventor: Atsushi Maeda, Zama (JP)

(73) Assignee: Hitachi, Ltd., Tokyo (JP)

( * ) Notice: Subject to any disclaimer, the term of this patent is extended or adjusted under 35 U.S.C. 154(b) by 839 days.

(21) Appl. No.: 09/768,472

(22) Filed: Jan. 25, 2001

(65) Prior Publication Data

US 2001/0023455 A1   Sep. 20, 2001

(30) Foreign Application Priority Data

Jan. 26, 2000   (JP)   ............................. 2000-017307

(51) Int. Cl.
*G06F 15/173* (2006.01)
(52) U.S. Cl. ...................... 709/242; 709/224; 709/225; 709/226; 709/229; 709/238; 714/4
(58) Field of Classification Search ................ 709/238, 709/201, 203, 217, 223, 224, 243
See application file for complete search history.

(56) References Cited

U.S. PATENT DOCUMENTS

| 5,490,258 | A | * | 2/1996 | Fenner | ........................... 711/1 |
| 5,539,883 | A | * | 7/1996 | Allon et al. | ................. 718/105 |
| 5,993,038 | A | * | 11/1999 | Sitbon et al. | ............... 709/202 |
| 6,006,259 | A | * | 12/1999 | Adelman et al. | ........... 709/223 |
| 6,112,248 | A | * | 8/2000 | Maciel et al. | ............... 709/238 |
| 6,249,801 | B1 | * | 6/2001 | Zisapel et al. | .............. 718/105 |
| 6,345,041 | B1 | * | 2/2002 | Kimball et al. | ............. 370/235 |
| 6,397,260 | B1 | * | 5/2002 | Wils et al. | ................... 709/238 |
| 6,556,547 | B1 | * | 4/2003 | Srikanth et al. | ............ 370/317 |

OTHER PUBLICATIONS

"Compex FreedomSwitch", Jan. 21, 1997, http://web.archive.org/web/*/http://www.cpx.com/switch.htm.*
S. Knight et.al., "[Internet-Draft]" Virtual Router Redundancy Protocol, IETF.

* cited by examiner

*Primary Examiner*—Bunjob Jaroenchonwanit
*Assistant Examiner*—Dohm Chankong
(74) *Attorney, Agent, or Firm*—Mattingly, Stanger, Malur & Brundidge, P.C.

(57) ABSTRACT

A traffic statistical processing unit of a switching processor measures a load to be relayed on a network, and the measured load data is exchanged between apparatus. A statistical data recorder records load data to be relayed over the network, respectively of each of other apparatus and each terminal and received from the traffic statistical processor unit. A terminal address table records as an entry a source address of each terminal from which data is relayed over the network. A filtering condition setter judges from the load data of the recorder whether the load of the apparatus is largest or relatively large, and if the load is largest or relatively large, determining an entry being passed to other apparatus having a smallest or relatively small load. A terminal table manager notifies the entry determined by the condition setter to the other apparatus and deleting the entry from the terminal address table.

7 Claims, 6 Drawing Sheets

| TERMINAL ADDRESS TABLE OF SWITCHING PROCESSING APPARATUS 1 | | |
|---|---|---|
| NETWORK SEGMENT 1 | NETWORK SEGMENT 2 | NETWORK SEGMENT 3 |
| ADDRESS OF TERMINAL 1 | ADDRESS OF TERMINAL 5 | ADDRESS OF TERMINAL 9 |
| ADDRESS OF TERMINAL 2 | ADDRESS OF TERMINAL 6 | |

| TERMINAL ADDRESS TABLE OF SWITCHING PROCESSING APPARATUS 2 | | |
|---|---|---|
| NETWORK SEGMENT 1 | NETWORK SEGMENT 2 | NETWORK SEGMENT 3 |
| ADDRESS OF TERMINAL 3 | ADDRESS OF TERMINAL 7 | ADDRESS OF TERMINAL 10 |

| TERMINAL ADDRESS TABLE OF SWITCHING PROCESSING APPARATUS 1 | | |
|---|---|---|
| NETWORK SEGMENT 1 | NETWORK SEGMENT 2 | NETWORK SEGMENT 3 |
| ADDRESS OF TERMINAL 1 | ADDRESS OF TERMINAL 5 | ADDRESS OF TERMINAL 9 |
| | ADDRESS OF TERMINAL 6 | |

| TERMINAL ADDRESS TABLE OF SWITCHING PROCESSING APPARATUS 2 | | |
|---|---|---|
| NETWORK SEGMENT 1 | NETWORK SEGMENT 2 | NETWORK SEGMENT 3 |
| ADDRESS OF TERMINAL 3 | ADDRESS OF TERMINAL 7 | ADDRESS OF TERMINAL 10 |
| ADDRESS OF TERMINAL 2 | | |

TERMINAL ADDRESS TABLE OF SWITCHING PROCESSING APPARATUS 1 (before)

| NETWORK SEGMENT 1 | NETWORK SEGMENT 2 | NETWORK SEGMENT 3 |
|---|---|---|
| ADDRESS OF TERMINAL 1 | ADDRESS OF TERMINAL 5 | ADDRESS OF TERMINAL 9 |
| ADDRESS OF TERMINAL 2 | ADDRESS OF TERMINAL 6 | |

TERMINAL ADDRESS TABLE OF SWITCHING PROCESSING APPARATUS 2 (before)

| NETWORK SEGMENT 1 | NETWORK SEGMENT 2 | NETWORK SEGMENT 3 |
|---|---|---|
| ADDRESS OF TERMINAL 3 | ADDRESS OF TERMINAL 7 | ADDRESS OF TERMINAL 10 |

⇒

TERMINAL ADDRESS TABLE OF SWITCHING PROCESSING APPARATUS 1 (after)

| NETWORK SEGMENT 1 | NETWORK SEGMENT 2 | NETWORK SEGMENT 3 |
|---|---|---|
| ADDRESS OF TERMINAL 1 | ADDRESS OF TERMINAL 5 | ADDRESS OF TERMINAL 9 |
| | ADDRESS OF TERMINAL 6 | |

TERMINAL ADDRESS TABLE OF SWITCHING PROCESSING APPARATUS 2 (after)

| NETWORK SEGMENT 1 | NETWORK SEGMENT 2 | NETWORK SEGMENT 3 |
|---|---|---|
| ADDRESS OF TERMINAL 3 | ADDRESS OF TERMINAL 7 | ADDRESS OF TERMINAL 10 |
| ADDRESS OF TERMINAL 2 | | |

FIG. 5

METHOD FOR BALANCING LOAD ON A PLURALITY OF SWITCHING APPARATUS

BACKGROUND OF THE INVENTION

The present invention relates to a method of balancing loads on a plurality of packet processing apparatus and to a packet processing apparatus, and more particularly to a load balancing method and a packet processing apparatus capable of improving a network reliability.

There is a conventional method of switching packet processing apparatus such as switching processing apparatus when any packet processing apparatus fails, without requesting terminals connected to the network to have a new function. For example, VRRP (Virtual Router Redundancy Protocol) is known as a hot standby protocol using virtual IP addresses. For the explanation of VRRP, refer to a document "[Internet-Draft]" Virtual Router Redundancy Protocol, by S. Knight et. al., published by IETF" (see www.ietf.org/internet-draft-vrrp-spec-v2-05.txt).

The hot standby protocol will be described below.

It is assumed that apparatus A and B having a packet relay function are connected to a network and that the apparatus A operates as a working apparatus and the apparatus B operates as a standby apparatus (a reserved apparatus). In this case, the standby apparatus B is in a hot standby state. Virtual link addresses and virtual IP addresses are set to the apparatus A and B. The virtual address is used as a destination address when each terminal connected to the network transmits a packet to the network. A packet having the virtual address as the destination address is generally received by the working apparatus A which in turn relays the packet.

The apparatus A and B monitor each other by periodically transmitting and receiving a packet. If a packet is not transmitted from the apparatus A during a predetermined period, the apparatus B judges that any failure occurred at the apparatus A, and succeeds the packet relay process executed by that time by the apparatus A. At this time, the same virtual link address and virtual IP address are set to the apparatus A and B so that the terminal can continue communications without being conscious of the succession of the packet relay process by the apparatus B.

According to the hot standby protocol described above, the apparatus (apparatus A in this example) for executing a packet relay process and the apparatus (apparatus B in this example) for succeeding the packet relay process upon occurrence of a failure are generally fixed.

SUMMARY OF THE INVENTION

The present inventors have studied a system utilizing the above-described hot standby protocol and found out the following issues to be solved.

Traffic of each segment in the network is fixedly assigned to each switching processing apparatus so that loads on switching processing apparatus may differ greatly. Further, since traffic is fixedly assigned to each switching processing apparatus, loads on lines may differ while traffic is transmitted to a WAN (Wide Area Network) from a plurality of switching processing apparatus via a plurality of packet relay apparatus. Still further, when a failure occurs at one switching processing apparatus and another switching processing apparatus succeeds the packet relay process, traffic is concentrated upon the succeeded switching processing apparatus.

Under such circumstances, the invention provides a load balancing method and a switching processing apparatus capable of sharing traffic uniformly to all working switching processing apparatus.

According to one aspect of the invention, a plurality of terminals connected to a local area network (LAN) divided into one or more network segments transmit packets. Two or more switching processing apparatus relay the transmitted packets to a wide area network (WAN) via packet relay apparatus and broadband lines. Each switching apparatus shares a relay operation by relaying only a packet having as a destination address a virtual address uniquely assigned to the switching apparatus. In this case, each switching processing apparatus dynamically changes the condition of sharing the packet relay operation. Also in this invention, if there are two or more lines (broadband lines) for connection to WAN, a traffic amount of each line of the packet relay apparatus is measured. Each switching processing apparatus changes the condition of sharing the packet relay operation, by reflecting statistical information on the traffic amount. Also in this invention, a packet relay operation in charge of a switching processing apparatus with a failure is inherited by another switching processing apparatus. In this case, the switching processing apparatus having a smallest relay traffic amount inherits the process executed by that time by the switching processing apparatus.

According to another aspect of the invention, the switching processing apparatus has a filtering condition setting unit for changing the filtering condition of selecting a packet. The packet relay apparatus has a traffic measuring unit for measuring an amount of traffic to WAN and a traffic statistical processing unit for notifying the measured result to the switching processing apparatus. The switching processing apparatus has a traffic statistical processing unit for receiving the traffic measurement result from the packet relay apparatus and the filtering condition is dynamically changed by the filtering condition setting unit in accordance with the information on the traffic measurement result.

The switching processing apparatus also has a table for registering terminal addresses and a terminal address managing unit for managing the terminal address table. The filtering condition setting unit sets the filtering condition in accordance with the source address of a packet. Therefore, the switching processing apparatus relays only the packet having as its source address the address registered in the terminal address table.

The switching processing apparatus also has a traffic measuring unit for measuring the traffic amount of each terminal belonging to each network segment and storing statistical information on the traffic amount in the terminal address table. The switching processing apparatus also has a terminal address setting unit. Each switching processing apparatus negotiates with other switching processing apparatus connected to the network segments belonging to the switching processing apparatus, and passes each entry in the terminal address table to the other switching processing apparatus in accordance with the traffic amount of each terminal.

The switching processing apparatus also has a switching notifying unit. The packet relay apparatus has a switching detecting unit and a shaping processing unit. When the switching processing unit inherits the packet relay operation in charge of the switching processing apparatus with a failure, the switching notifying unit notifies a succession of the packet relay operation to the switching detecting unit of the packet relay apparatus. The switching detecting unit activates the shaping processing unit which in turn preferentially transmits an important traffic to the line connected to WAN.

The switching processing apparatus also has a priority setting unit for setting a priority to determine which switching processing apparatus inherits the packet relay operation in charge of the switching processing apparatus with a failure. In accordance with the traffic measurement result notified from the packet relay apparatus, the priority setting unit of each switching processing apparatus dynamically sets the priority so that the switching processing apparatus with the smaller traffic amount is given a higher priority.

When the operation of the switching processing apparatus with a failure is recovered, the filtering setting unit of the other switching processing apparatus inherited the process from the recovered switching processing apparatus selects an entry to be passed to the recovered switching processing apparatus among those entries in the terminal address table, in accordance with the traffic measurement result notified from the packet relay apparatus. After the terminal address management table notifies the selected entry to the recovered switching processing apparatus, the operation is passed to the recovered switching processing apparatus.

According to another aspect of the invention, a plurality of terminals connected to a local area network (LAN) divided into one or more network segments transmit packets. Two or more switching processing apparatus relay the transmitted packets to a wide area network (WAN) via packet relay apparatus and broadband lines. In this case, the invention also provides a program or a storage medium storing the program. The program realizes a function of dynamically passing a portion of the relay operation to each switching processing apparatus so that the load of the relay operation shaped by each switching processing apparatus becomes approximately uniform.

DETAILED DESCRIPTION OF THE EMBODIMENTS

Embodiments of the invention will be described with reference to the accompanying drawing in detail hereinunder.

Figure 1:
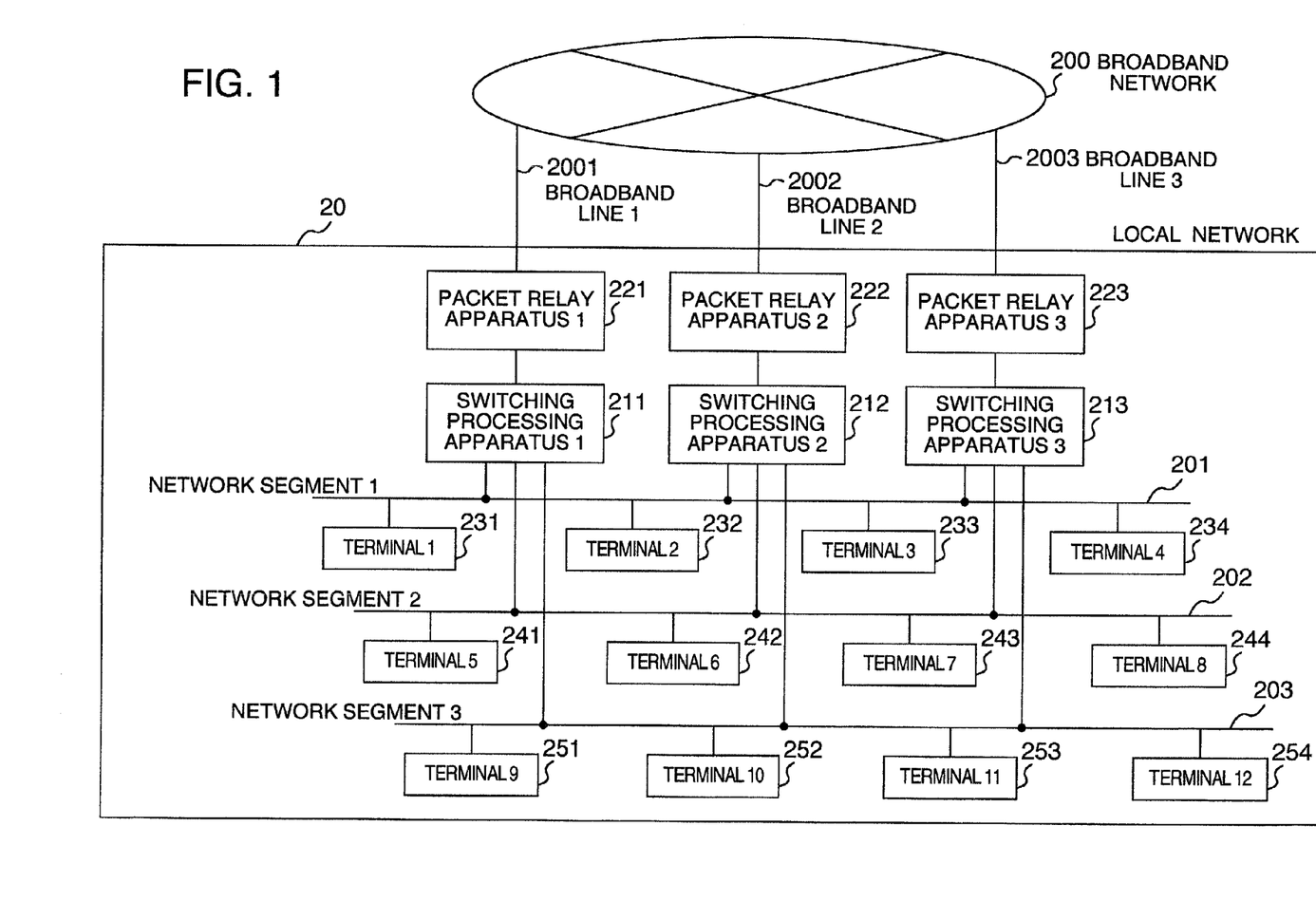
FIG. 1 is a diagram showing the configuration of a network.

FIG. 1 is a diagram showing the configuration of a network constituted of a plurality of network segments and a WAN.

Referring to FIG. 1, each of switching processing apparatus 1, 2 and 3 (211, 212 and 213) has a function of relaying a packet by referring to an address at the network layer of the OSI model or an address at the IP layer of the TCP/IP model.

Each of packet relay apparatus 1, 2 and 3 (221, 222 and 223) has a function of relaying a packet by referring to an address at the network layer of the OSI Model or an address at the IP layer of the TCP/IP model as well as a function of relaying a packet to WAN. A LAN (20) is divided into a plurality of network segments 1, 2 and 3 (201, 202 and 203). LAN (20) may have one or more network segments and the total number of network segments may take any number. Although three switching processing apparatus and three packet processing apparatus are shown in FIG. 1, the number of these apparatus is not limited to only three but it may take any number. Further, although four terminals are connected to each network segment, the number of terminals may take any number of one or more.

In this embodiment, the packets transmitted from terminals 1 to 4 (231 to 234) connected to the network segment 1 (201) can be received by the switching terminals 1 to 3 (211 to 213). This arrangement is also applied to the network segments 2 and 3 (202 and 203).

It is assumed that an interface to the network segment 1 of each of the switching processing apparatus 1 to 3 (211 to 213) has real addresses as well as a virtual link address 1 and a virtual IP address 1. A filtering condition for a destination address, a source address and the like contained in a packet header is set to each switching processing apparatus. Each packet is essentially compatible with one of the filtering conditions. For example, the filtering condition to be set to each switching processing apparatus may be determined from the source address contained in the packet header. In this case, the filtering condition may be determined in accordance with each source address, an even or odd number of each source address, or the like. The filtering condition may also be determined in accordance with information on the transport layer or TCP layer contained in each packet.

If the terminal 1 (231) transmits a packet having the virtual address 1 as the destination address to the network segment 1 (201), the packet contents are compatible with only the filtering condition of the switching processing apparatus 1 (211). In this case, the switching processing apparatus 1 (211) relays the packet to the network segment 2 or 3 (202 or 203) other than the network segment 1 (201) or to the packet relay apparatus 1 (221). In this case, the other switching processing apparatus 2 and 3 (212 and 213) will not execute the packet relay process.

Next, the structure of the switching processing apparatus will be detailed with reference to FIG. 2.

Figure 2:
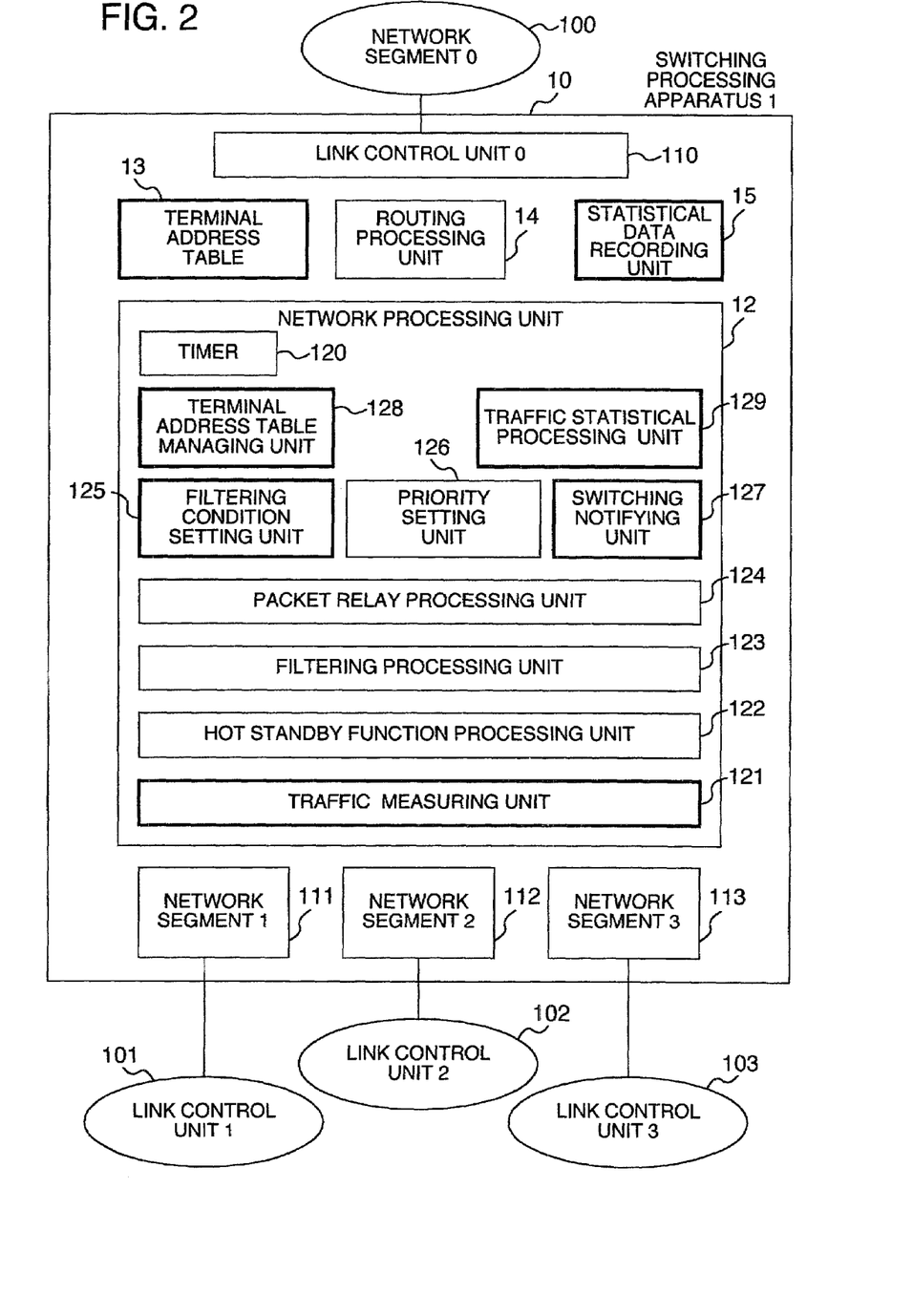
FIG. 2 is a diagram showing the structure of a switching processing apparatus according to an embodiment of the invention.

FIG. 2 is a block diagram showing the structure of the switching processing apparatus 1 shown in FIG. 1. The switching processing apparatus 2 and 3 shown in FIG. 1 have also the same structure.

A switching processing apparatus 1 (10) has link control units 0 to 3 (110 to 113), a network processing unit (12) a terminal address table (13) and a routing processing unit (14).

The link control unit 0 (110) is connected to a network segment 0 (100). The network segment 0 (100) corresponds to a connection line to the packet relay apparatus 1 shown in FIG. 1. The link control unit 1 (111) is connected to a network segment 1 (101). The link control unit 2 (112) is connected to a network segment 2 (102). The link control unit 3 (113) is connected to a network segment 3 (103). The link control units 0 to 3 (110 to 113) execute a packet transmission/reception process at the hierarchical level corresponding to the physical layer and data link layer of the OSI model or the link layer of the TCP/IP model.

The network processing unit (12) is at the level higher than the link control units 0 to 3 (110 to 113) and executes the packet relay process at a level corresponding to the network layer of the OSI model or the IP layer of the TCP/IP model. The network processing unit (12) has a traffic measuring unit (121), a hot standby function processing unit (122), a filtering processing unit (123), a packet relay processing unit (124), a filtering condition setting unit (125), a priority setting unit (126), a switching notifying unit (127), a terminal address table managing unit (128) and a traffic statistical processing unit (129).

The traffic measuring unit (121) measures the amount of traffic. The traffic is equal to the number of packets received and to be processed by the link control units 1 to 3 (111 to 113). The traffic measuring unit (121) also has a function of measuring the amount of traffic of each terminal or packet transmission source. The hot standby function processing unit (122) periodically checks whether the other switching processing apparatus connected to the network segment 1 (101) operate in a normal state. Upon detection of a switching processing apparatus having a failure, the hot standby function processing unit (122) executes a process for succeeding the packet relay process executed by that time by the switching processing apparatus. The host standby function processing unit (122) executes similar operations for the other switching processing units connected to the network segments 2 and 3 (102 and 103). The filtering processing unit (123) passes the packet compatible with the filtering condition preset or altered occasionally, to the packet relay processing unit (124), and discards the packet not compatible with the filtering condition. The packet relay processing unit (124) receives a packet from the filtering processing unit (123), refers to the destination address contained in the packet header, and inquires the routing processing unit (14) about the network segment belonging to the destination address, i.e., about the route to the destination address. In response to a reply from the routing processing unit (14), the packet relay processing unit (124) passes the packet to one of the link control units 0 to 3 (110 to 113).

The filtering condition setting unit (125) executes a filtering condition alteration process in cooperation with the other switching processing apparatus connected to the network segments 1 to 3 (101 to 103). The priority setting unit (126) sets a priority to each packet in accordance with the contents of the packet header such as a destination address and a source address. As a method of setting a priority to a packet, already known methods may be used such as utilizing a portion of a field in the packet header. The switching notifying unit (127) executes a process of notifying a succession of the process executed by a switching processing apparatus with a failure to a network apparatus belonging to the network segment 0 (100), i.e., the packet relay apparatus 1 shown in FIG. 1. The terminal address managing unit (128) manages entries of the terminal address table (13). If the filtering condition processing unit (123) selects a packet by using the source address as the filtering condition, then the terminal address table (13) is a database having as entries only those source addresses compatible with the filtering condition. The traffic statistical processing unit (129) receives traffic amount data from the network apparatus belonging to the network segment 0 (100), i.e., the packet relay apparatus 1 shown in FIG. 1, and stores it. The routing processing unit (14) stores and updates routing information and responds to a destination address route inquiry by the packet relay processing unit (124). A statistical data recording unit (15) stores traffic data amount supplied from the packet relay apparatus 1 shown in FIG. 1 and stores statistically processed traffic amount data.

In FIG. 2, the switching processing unit 1 (10) has four link control units. The switching processing unit 1 (10) may have two or more link control units in accordance with the number of network segments connected to the switching processing unit 1 (10).

Next, the structure of the packet relay unit will be described with reference to FIG. 3.

Figure 3:
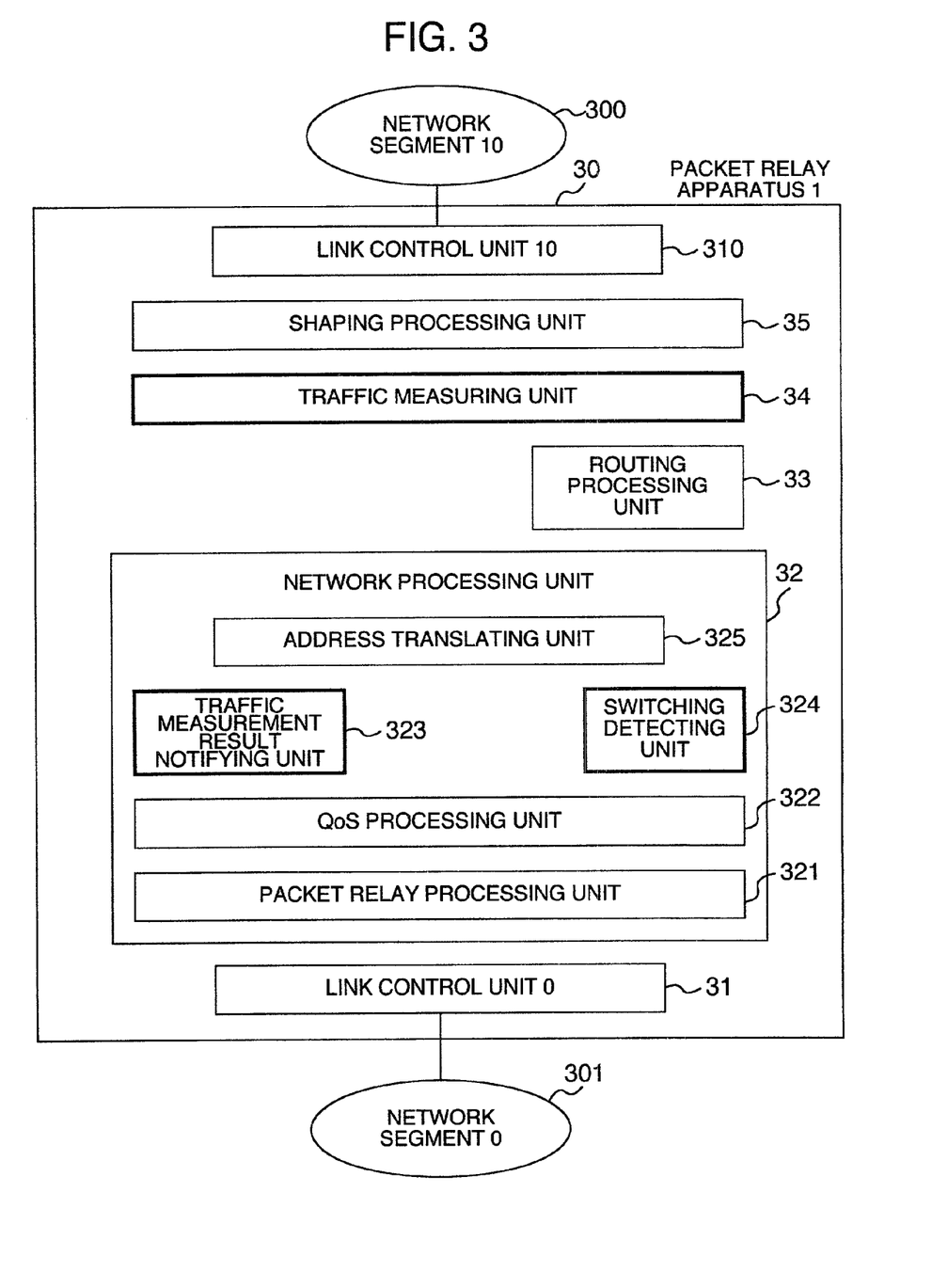
FIG. 3 is a diagram showing the structure of a packet relay apparatus according to an embodiment of the invention.

FIG. 3 is a block diagram showing the structure of the packet relay apparatus 1 shown in FIG. 1. The packet relay apparatus 2 and 3 shown in FIG. 1 have the same structure.

A packet relay apparatus 1 (30) has a link control unit 0 (31), a link control unit 10 (310), a network processing unit (32), a routing processing unit (33), a traffic measuring unit (34) and a shaping processing unit (35). The link control unit 0 (31) is connected to a network segment 0 (301). The network segment 0 (301) corresponds to a connection line to the switching processing unit 1 shown in FIG. 1. The link control unit 10 (310) is connected to a network segment 10 (300). The network segment 10 (310) corresponds to WAN (200) shown in FIG. 1. The network processing unit (32) is at a level higher than the link control units 0 and 10 (31 and 310) and executes a packet relay process at the hierarchical level corresponding to the network layer of the OSI model or the IP layer of the TCP/IP model. The network processing unit (32) has a packet relay processing unit (321), a QoS processing unit (322), a traffic statistical processing unit (323) and a switching detecting unit (324).

The packet relay processing unit (321) receives a packet from the link control unit 0 (31), refers to a destination address contained in the packet header, and inquires the routing processing unit (33) about the network segment belonging to the destination address, i.e., about the route to the destination address. In response to a reply from the routing processing unit (33), the packet relay processing unit (321) passes the packet to either the link control unit 0 (31) or the shaping processing unit (35). The QoS processing unit (322) determines an importance degree of the packet from the contents of the packet and notifies the importance degree data to the shaping processing unit (35).

The traffic measuring unit (34) measures the amount of traffic to be passed from the packet relay processing unit (321) to the shaping processing unit (35), i.e., the number of packets, and notifies it to the shaping processing unit (35). The traffic measuring unit (34) has also a function of measuring the traffic amount for each packet source terminal. The shaping processing unit 35 compares the traffic amount notified by the traffic measuring unit (340) with the capacity of a line interconnecting the network segment 10 (300) and the link control unit 10 (310), i.e., the capacity of a broadband line 1 (2001) shown in FIG. 1. If the traffic amount is larger than the line capacity, a packet having a higher importance degree is preferentially passed to the link control unit 10 (310), in accordance with the importance degree information notified by the QoS processing unit (322). A traffic measurement result notifying unit (323) performs a process of notifying the traffic amount measured by the traffic measuring unit (34) to the switching processing apparatus belonging to the network segment 0 (301), i.e., the switching processing apparatus 1 shown in FIG. 1. The switching detecting unit (324) detects a succession of the process of a switching processing apparatus with a failure to the switching processing apparatus 1 shown in FIG. 1. An address translating unit (325) translates the destination address in the packet header from a LAN address to a WAN address when the packet is relayed from LAN to WAN. Conversely, it translates the destination address in the packet header from a WAN address to a LAN address when the packet is relayed from WAN to LAN.

As described earlier, although the traffic measuring unit (34) of the packet relay apparatus 1 (30) measures the amount of traffic to be transmitted to the network segment 10 (300) for each terminal, it may have a function of measuring the amount of traffic received from the network segment for each terminal.

In FIG. 3, although the packet relay apparatus 1 (30) has two link control units, it may have two or more link control units in accordance with the number of network segments connected to the packet relay apparatus 1 (30).

Next, a method of distributing loads on broadband lines through cooperation among switching processing apparatus will be described.

In the packet relay apparatus 1 (221), the traffic measuring unit (34) measures the amount of traffic to be relayed to WAN (200) via the broadband line 1 (2001), and the traffic measurement result notifying unit (323) periodically notifies the measured result to the switching processing apparatus 1 (211). In this case, the traffic amount for each terminal is also measured and notified to the switching processing apparatus 1 (211). Similarly, in the packet relay apparatus 2 (222), the traffic measuring unit measures the amount of traffic to be relayed to WAN (200) via the broadband line 2 (2002), and the traffic measurement result notifying unit periodically notifies the measured result to the switching processing apparatus 2 (212). Similarly, in the packet relay apparatus 3 (223), the traffic measuring unit measures the amount of traffic to be relayed to WAN (200) via the broadband line 3 (2003), and the traffic measurement result notifying unit periodically notifies the measured result to the switching processing apparatus 3 (213).

In the switching processing apparatus 1 (211), the traffic statistical processing unit (129) receives the measured result of the amount of traffic to be relayed from the packet relay apparatus 1 (221) to WAN (200), and the statistical data recording unit (15) stores it. Similarly, in the packet relay apparatus 2 and 3 (222 and 223), the switching processing units 2 and 3 (212 and 213) receive the measured traffic amounts at the traffic statistical processing units and store them in the statistical data recording units.

In the switching processing apparatus 1 to 3 (211 to 213), the traffic statistical processing units periodically exchange the amounts of traffics to be relayed to WAN (200) received from the packet relay apparatus 1 to 3 (221 to 223). For example, the switching processing units exchange the amounts of traffics by using the network segments 1 to 3 or unrepresented signal lines interconnecting the apparatus. Each of the switching processing apparatus 1 to 3 (211 to 213) stores the amounts of traffics received from the other switching processing apparatus in its statistical data recording unit. In this case, in the switching processing unit 1 (211), the traffic statistical processing unit (129) calculates the amount of traffic received from the packet relay apparatus 1 (221) and an average of the amounts of traffics received from the other switching processing apparatus, and these values are also stored in the statistical data recording unit (15). These operations are also executed in the switching processing apparatus 2 and 3 (212 and 213). In addition, in the switching processing apparatus 1 to 3 (211 to 213), the traffic statistical processing units calculate the loads on the broadband lines in accordance with the amounts of traffics to be relayed to WAN (200), and these values are also stored in the statistical data recording units (15). A load on each broadband line can be obtained by calculating a ratio of the traffic amount to the capacity of the broadband line and an unused capacity of the broadband line.

In the switching processing apparatus 1 to 3 (211 to 213), the filtering condition setting units (125) alter the filtering conditions in cooperation with each other so that the load on each broadband line becomes uniform.

A method of altering the filtering condition will be described with reference to the flow chart of FIG. 5.

The filtering condition altering method will be described by taking as an example the case wherein each switching processing apparatus sets the filtering condition by designating the source address of a packet to be relayed.

Figure 5:
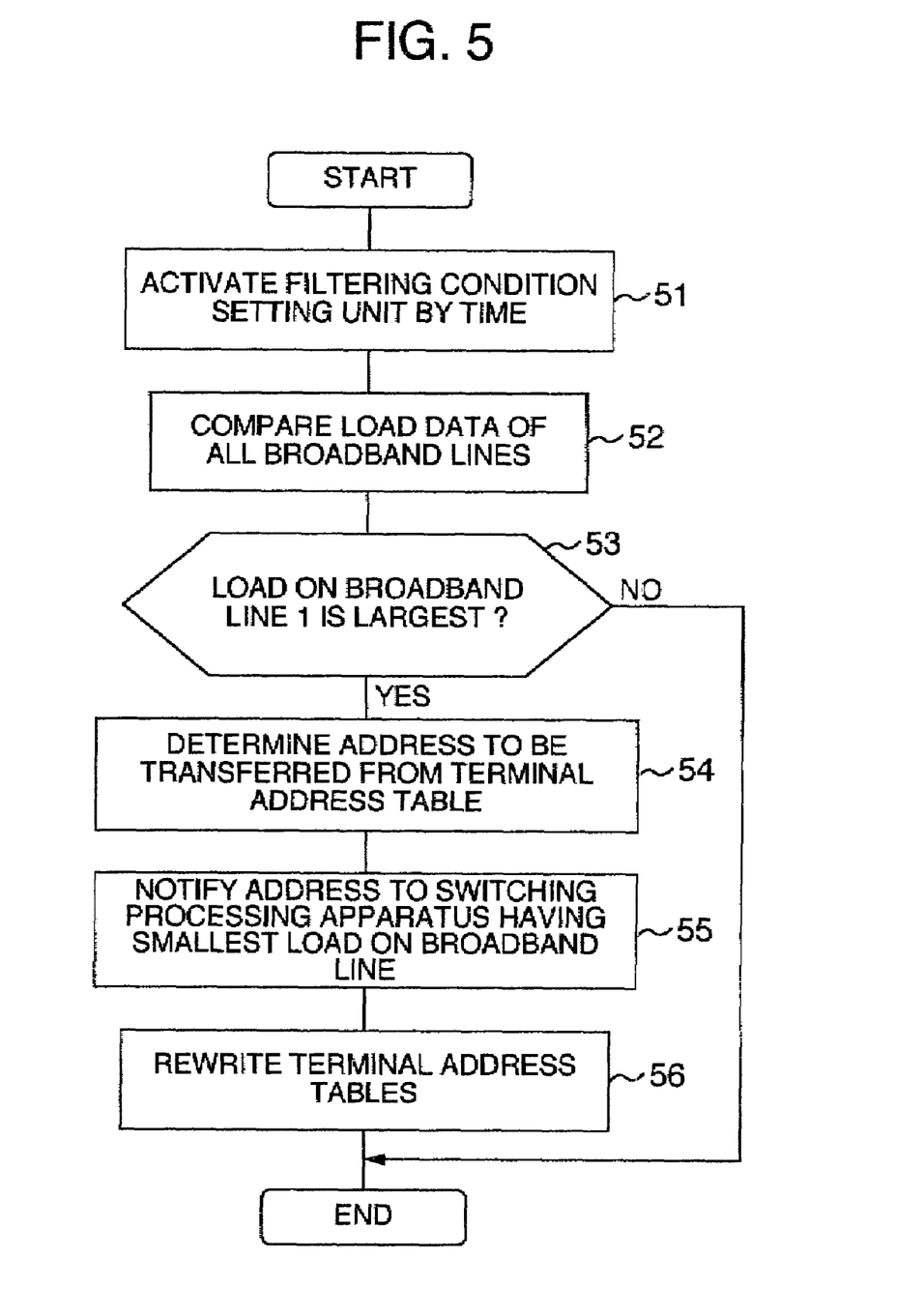
FIG. 5 is a flow chart illustrating a filtering condition alteration process to be executed by the switching processing apparatus.

FIG. 5 is a flow chart illustrating a filtering condition alteration process to be executed by the switching processing apparatus 1. The other switching processing apparatus execute a similar process.

In this example, in the switching processing apparatus 1, the filtering processing unit (123) receives only those packets whose headers contain the addresses designated in terminal address tables as the source addresses, and discards other packets. Conversely, in the switching processing apparatus, the filtering processing unit may discard only those packets whose headers contain the addresses designated in terminal address tables as the source addresses.

First, a timer (120) of the switching processing apparatus 1 periodically activates the filtering condition setting unit (125) (Step 51). Next, the activated filtering condition setting unit (125) acquires information on the load on each broadband line stored in the statistical data recording unit (15) and compares the loads (Step 52). If the load on the broadband line 1 (2001) is not the largest among the loads, the flow terminates (Step 53). If the load on the broadband line 1 (2001) is the largest among the loads on all the broadband lines, the filtering setting unit (125) identifies one of the switching processing apparatus 2 and 3 having the smallest load on the broadband line. The filtering condition setting unit (125) selects the entry from the entries of the terminal address table (13), the selected entry being transferred to the terminal table of the identified switching processing apparatus. In this case, the filtering condition setting unit (125) refers to the traffic amount of each terminal stored in the statistical data recording unit (15) and selects the entry so that the loads on the broadband lines of the switching processing apparatus 1 and identified switching processing apparatus are balanced. A plurality of entries may be transferred (Step 54). Next, after the filtering condition setting unit (125) selects the entry, the terminal address table managing unit (128) notifies the identified switching processing apparatus of the entry selected to be transferred. The switching processing apparatus received this notice adds the notified entry to its terminal address table (Step 55). Lastly, the terminal address table managing unit (128) deletes the entry transferred to the other switching processing apparatus from its terminal address table (13) (Step 56).

Figure 4:
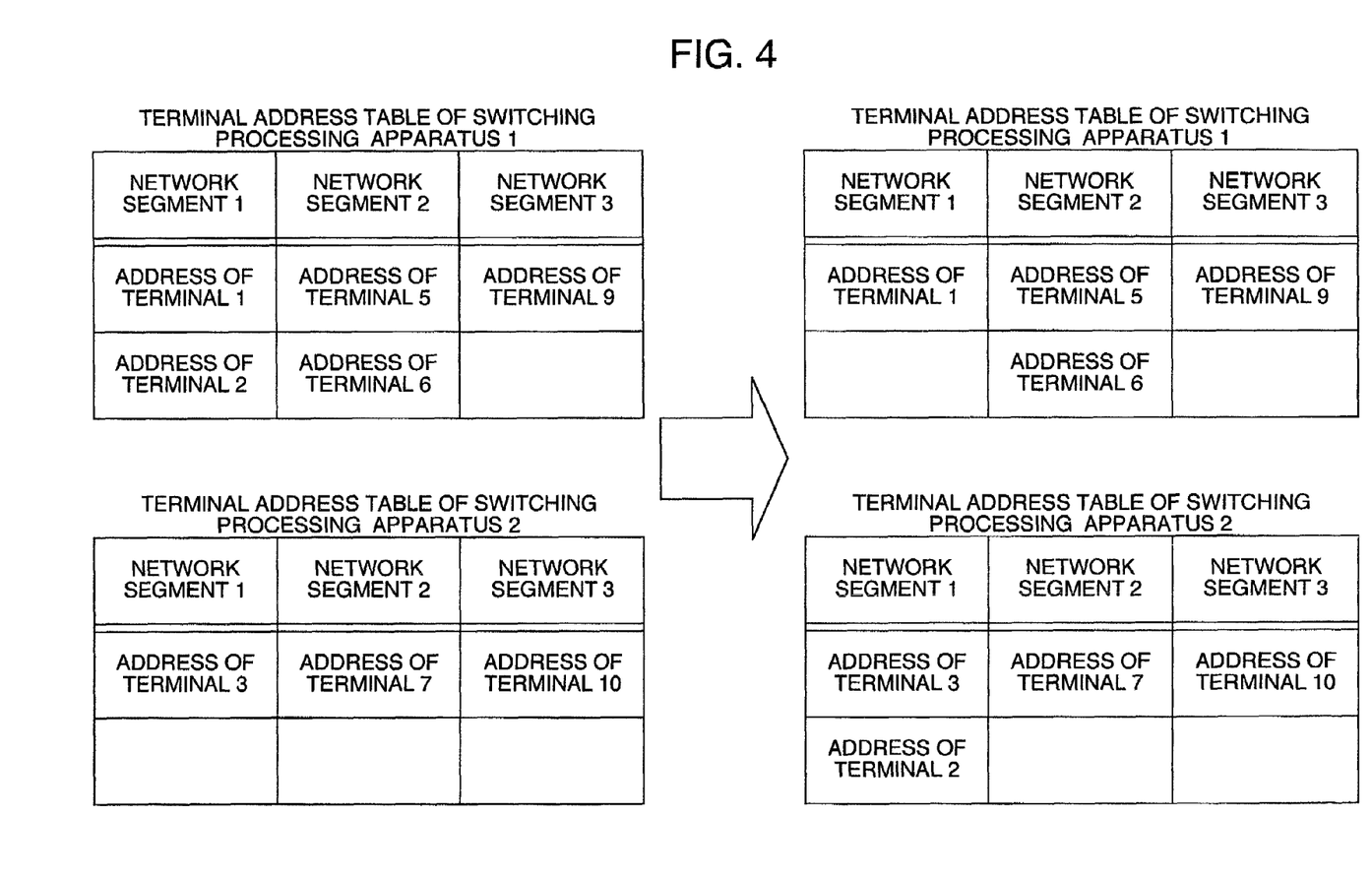
FIG. 4 is a diagram showing the structures of each terminal address table in the switching processing apparatus.

A specific example of Steps 55 and 56 is illustrated in FIG. 4 wherein an entry is transferred from the switching processing apparatus 1 (211) to the switching processing unit 2 (212) when the load on the broadband line 1 (2001) is largest. FIG. 4 is a diagram showing the structures of terminal address tables of the switching processing apparatus.

In FIG. 4, the address of the terminal 2 is transferred from the terminal address table of the switching processing apparatus 1 to the terminal address table of the switching processing apparatus 2.

The above-described filtering condition alteration process is repeated at each switching processing apparatus by using the timer (120) to balance the loads on respective broadband lines.

With this method, the filtering condition is altered in accordance with a periodical comparison of the loads on broadband lines. The filtering condition may be altered by the packet relay apparatus when the amount of traffic to be relayed to WAN (200) exceeds the capacity of the broadband line. In this case, a threshold value of the capacity of each broadband line is set beforehand to the traffic statistical processing unit of each switching processing apparatus. Upon reception of information on the amount of traffic from each packet relay apparatus, the traffic statistical processing unit of each switching processing apparatus calculates the load on the broadband line. The calculated load is compared with the preset threshold value. If the load exceeds the threshold value, the traffic statistical processing unit activates the filtering condition setting unit. The operations to be performed thereafter are similar to those illustrated in FIG. 5.

The filtering processing unit (123) of the switching processing apparatus 1 (10) shown in FIG. 2 is provided in the network processing unit (12). In this case, the filtering processing unit (123) performs the filtering process by using addresses at the network layer of the OSI model or the IP layer of the TCP/IP model. The filtering processing unit (123) may be provided in the link control unit to perform the filtering process by using addresses at the data link layer of the OSI model or the link layer of the TCP/IP model. In this case, the entry of the terminal address table (13) is designated by using an address at the link layer of the terminal.

As described earlier, by making uniform the loads on a plurality of broadband lines of the network configured as shown in FIG. 1, the loads on a plurality of packet relay apparatus can be made uniform. Broadband lines to be connected to WAN are generally supplied from carriers and are expensive in proportion with the line capacity. The loads made uniform can reduce the necessary capacity of each broad line and the cost can be reduced correspondingly. The loads on switching processing apparatus may be distributed by monitoring the traffics from the switching processing apparatus to packet relay apparatus.

Although the packet relay apparatus and switching processing apparatus are structured as discrete apparatus in FIG. 1, the switching processing apparatus may have a function similar to that of the packet relay apparatus. Although three packet relay apparatus are used in FIG. 1, one or two packet relay apparatus may also be used. In this case, one packet relay apparatus is connected to a plurality of switching processing apparatus. Further, although a separate broadband line is used for connection of each packet relay apparatus to WAN (200) via a packet relay apparatus, a single broadband line to WAN (200) may be used if a plurality of switching processing apparatus are connected to a single packet relay apparatus. In this case, the broadband line is logically divided into a plurality of channels and the packet relay apparatus has a function of transmitting a traffic from each switching processing apparatus to a different channel. Still further, although each network segment is physically separated, each network segment may be a logically divided network segment.

Next, with reference to FIG. 6, a description will be given for a method of preventing traffic from concentration upon a particular broadband line when a failure occurs at one switching processing apparatus in the network configured as shown in FIG. 1.

Figure 6:
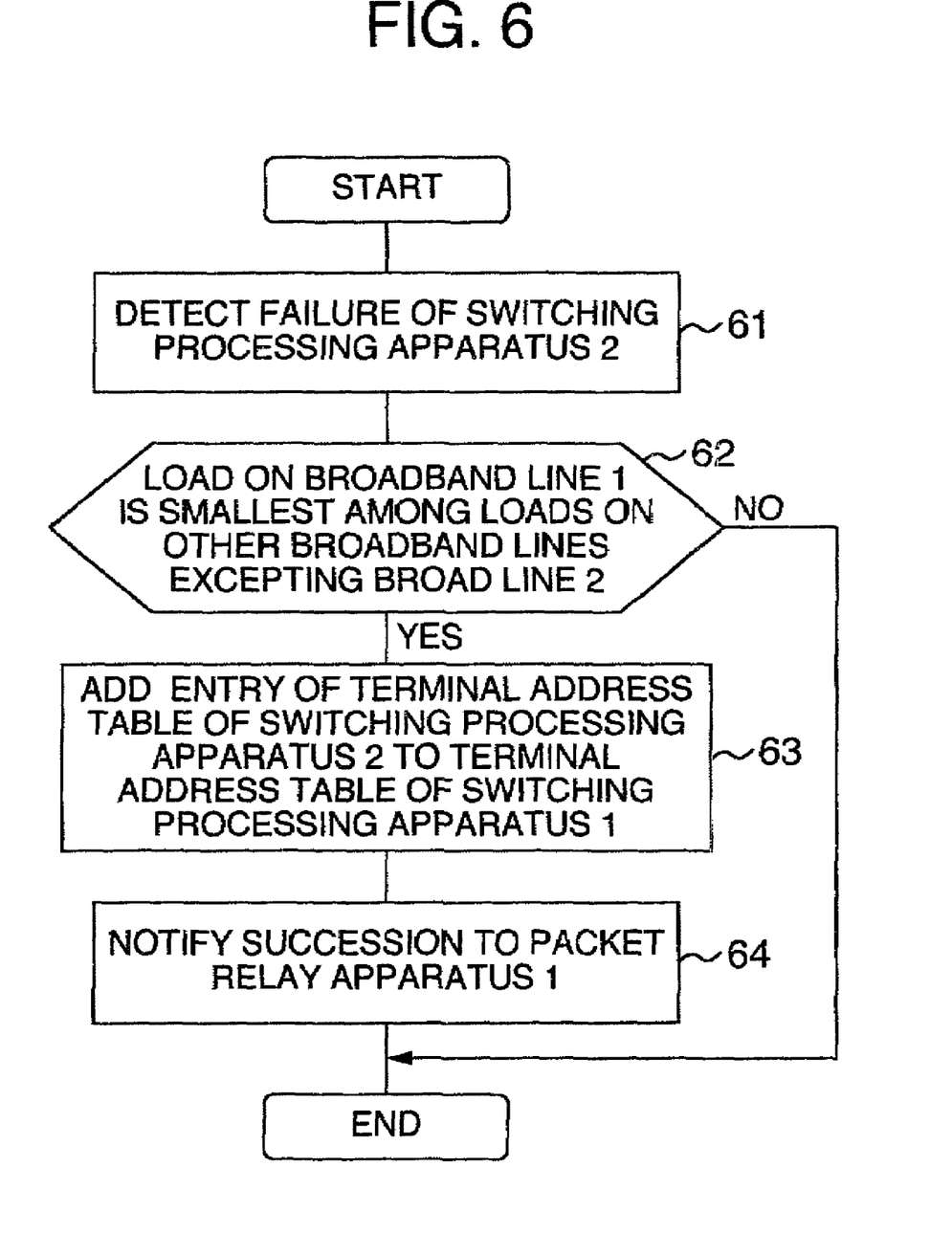
FIG. 6 is a flow chart illustrating a succession operation to be executed by a switching processing apparatus when a failure occurs at another switching processing apparatus.

FIG. 6 is a flow chart illustrating the operation to be executed by the switching processing apparatus 1 (211) when a failure occurs at the switching processing apparatus 2 (212) shown in FIG. 1.

The switching processing apparatus 1 or 2 (211 or 212) monitors each other through periodical heartbeat or the like using the hot standby function processing unit (122) shown in FIG. 2 to thereby detect any failure of the other switching processing apparatus. For this heartbeat, each switching processing apparatus transfers a packet to the other switching processing apparatus by adding information on entries of its terminal address table (13). Therefore, each switching processing apparatus can obtain the information of the terminal address table (13) of the other switching processing apparatus.

First, the switching processing apparatus 1 (211) detects any failure of the switching processing apparatus 2 (212) by using the hot standby function processing unit (122) (Step 61). The switching processing apparatus 1 (211) refers to the data stored in the statistical data recording unit (15) to check whether the load on the broadband line 1 (2001) is smallest among the loads on the broadband lines excepting the broadband line 2 (2002). If the load on the broadband line 1 (2001) is not smallest, the flow terminates (Step 62). If the load on the broadband line 1 (2001) is smallest, the switching processing apparatus 1 (211) adds an entry of the terminal address table of the switching processing apparatus 2 (212) to its terminal address table (13). Namely, the switching processing apparatus 1 (211) succeeds the packet relay process once in charge of the switching processing apparatus 2 (212) (Step 63). In the switching processing apparatus 1 (211), the switching notifying unit (127) notifies the packet relay apparatus 1 (221) of a succession of the packet relay process in charge of the switching processing apparatus 2 (212) (Step 64).

This method of determining which switching processing apparatus succeeds the packet relay process of the switching processing apparatus with a failure in accordance with the loads on broadband lines can prevent line defects and apparatus detects to be caused by traffic concentration and can reduce the packet loss amount to be caused by a temporary increase in the load on a broadband line.

In the packet relay apparatus 1 (221) received a notice from the switching processing apparatus 1 (211), the switching detecting unit (324) shown in FIG. 3 detects a succession of the packet relay process of the switching processing apparatus 2 (212) to the switching processing apparatus 1 (211). At this time, the switching detecting unit (324) of the packet relay apparatus 1 (221) activates the shaping processing unit (35) shown in FIG. 3. The shaping processing unit (35) of the packet relay apparatus 1 (221) refers to the packet priorities preset to the priority setting unit (126) of the switching processing apparatus 1 (211), and preferentially transmits the packet having a high priority to WAN (200).

With this shaping process, an important traffic can be protected when any switching processing apparatus has a failure and the other switching processing apparatus succeeds the packet relay process.

Next, a description will be given for a method of making uniform the loads on all broadband lines of WAN (200) when the switching processing apparatus with failure recovers and the packet relay process is returned from the other switching processing apparatus. The switching processing apparatus recovered after a failure is assumed to be the switching processing apparatus 1 (211) shown in FIG. 1. The recovered switching processing apparatus 1 (211) acquires information on the traffic amounts of other broadband lines 2 and 3 of the switching processing apparatus 2 and 3 (212 and 213). Next, the switching processing apparatus 1 (211) succeeds a portion of the packet relay process from the switching processing apparatus 2 or 3 (212 or 213) having the largest load on the broadband line. A method of succeeding a portion of the packet relay process may be, for example, a method of transferring a portion of entries of the terminal address table of the switching processing apparatus having the largest load on the broadband line to the terminal address table (13) of the switching processing apparatus 1 (211) to make uniform the loads on both the broadband lines.

A program implementing the function of the above-described embodiment may be supplied in the form of a storage medium such as FD and CD-ROM. As a method of installing this program to each switching processing apparatus and each packet relay apparatus, the program stored in the storage medium may be read by a reader and copied to storage media such as hard disks of switching processing apparatus and packet relay apparatus. Alternatively, if the program is stored in a storage medium of an information processing apparatus connected to a network, the program can be copied via the network to storage media such as hard disks of switching processing apparatus and packet relay apparatus.

In the embodiment, a load is distributed from the switching processing apparatus having the largest load on the broadband line to the switching processing apparatus having the smallest load on the broadband line. The invention is not limited only to this embodiment, but a load may be distributed from the switching processing apparatus having the load on the broadband line larger than a predetermined threshold value to the switching processing apparatus having the load on the broadband line equal to or smaller than the predetermined threshold value. Alternatively, a load may be distributed from one switching processing apparatus to another switching processing apparatus having the smaller load on the broadband line. Further, the amount of traffic to be relayed to the network by the switching processing apparatus or packet relay apparatus and the load on each broadband line as well as the amount of traffic to be relayed to WAN and the load for each source address or each terminal may be stored in a terminal address table or other suitable storage devices in addition to the statistical data recording units.

According to this embodiment, traffic can be assigned uniformly to each of all working switching processing apparatus channel when each of a plurality of switching processing apparatus relays packets transmitted from a plurality of terminals connected to LAN, to WAN via packet relay apparatus and broadband lines.

According to this embodiment, loads on broadband lines can be made uniform when a plurality of packet relay apparatus transmit traffics to a network (particularly WAN) via broadband lines.

According to this embodiment, it is possible to prevent concentration of traffics on a particular switching processing apparatus when a failure occurs at any switching processing apparatus.

What is claimed is:

1. A load balancing method for a first network and a second network, said second network having a plurality of segments each connecting terminals, for relaying data between the first and second networks, each segment including a plurality of apparatuses each relaying a packet between the first network and the segment, said method comprising the steps of:

storing source addresses of the terminals for relaying data in the first network, in a terminal address table provided in each apparatus relaying data between the terminals and the first network, said each apparatus relaying data having said source addresses stored in its associated table;

measuring a load of data to be relayed in the first network and exchanging load between a plurality of the apparatus;

if the load data to be relayed in the first network via one apparatus is largest or relatively large, selecting another apparatus having a smallest or relatively small load, and deleting a source address selected in accordance with the load to be relayed in the first network for each of source addresses of the terminals, from said terminal address table;

notifying the selected other apparatus of the source address of the terminal deleted from the terminal address table of said one apparatus; and storing the deleted source address in the terminal address table of the notified other apparatus.

2. A load balancing method according to claim 1, further comprising the steps of:

when a failure at the other apparatus is detected, judging whether the load of the one apparatus is smallest or relatively small; and if the load of the one apparatus is smallest or relatively small, inheriting an entry of said other apparatus.

3. A load balancing apparatus comprising:

a measuring unit for measuring a load of data to be relayed in a network;

a statistical processing unit for exchanging load data measured by said measuring unit between the apparatus and other apparatus;

a data recording unit for recording the load data to be relayed in the network, respectively of each of the other apparatus and each terminal received from said statistical processing unit;

a terminal address table for recording as an entry a source address of each terminal for relaying data in the network;

a condition setting unit for judging from the load data recorded in said recording unit whether the load of the apparatus is largest or relatively large, and if the load is largest or relatively large, determining an entry which is passed to the other apparatus having a smallest or relatively small load; and a terminal table managing unit for notifying the entry determined by said condition setting unit to the other apparatus and deleting the entry from the terminal address table.

4. A load balancing method for balancing loads of a plurality of processing apparatus, each processing apparatus relaying a packet between a first network and a second network, said second network having a plurality of segments each connecting terminals, said method comprising the steps of:

in each processing apparatus:

registering source addresses of the terminals for relaying said packet in the first network, in a terminal address table provided in each apparatus;

relaying a packet having an address registered in the terminal address table as a source address;

measuring a load of packet to be relayed in the first network and exchanging load data regarding load between an apparatus of said plurality of processing apparatus performing the measuring and other of said plurality of processing apparatus;

selecting another processing apparatus and a source address to be moved to said another processing apparatus such that said measured load may be changed according to the exchanged load data and notifying said selected another processing apparatus of the selected source address;

deleting said notified source address from said terminal address table of the apparatus; and if a further source address is notified from a further processing apparatus, registering the notified further source address in said terminal address table of the apparatus.

5. A method according to claim 4, wherein said selecting step, when the load data indicates that the load of the apparatus is larger than that of another processing apparatus, selects another apparatus having a small load, and selects a source address to be moved to said selected another processing apparatus.

6. A method according to claim 4, further comprising a step of, in response to occurrence of a failure in said another processing apparatus, registering a source address registered in the terminal address table of the faulty another apparatus, in the terminal address table of the apparatus if the load of the apparatus is determined to be smaller than that of the faulty another processing apparatus.

7. A load-balance processing apparatus for relaying a packet between a first and a second network, said second network having a plurality of segments each connecting terminals, said apparatus comprising:

a terminal address table holding source addresses of the terminals;

means for replaying a packet to be transmitted, said packet having a source address registered in said terminal address table;

a first traffic measuring unit for measuring the amount of traffic between the load-balance processing apparatus and said first network for each terminal;

a second traffic measuring unit for measuring the amount of traffic between the load-balance processing apparatus and said segment for each terminal;

a statistical processing unit for exchanging the traffic amounts measured by said first traffic measuring unit and said second traffic measuring unit, with those of another processing apparatus;

a recording unit for recording said traffic amounts of the load-balance processing apparatus and the exchanged traffic amounts; and means for moving said source address held in said terminal address table to a terminal address table of another processing apparatus in accordance with said traffic amounts of the load-balance processing apparatus and the another processing apparatus recorded in said recording unit.

* * * * *